Patented Sept. 27, 1949

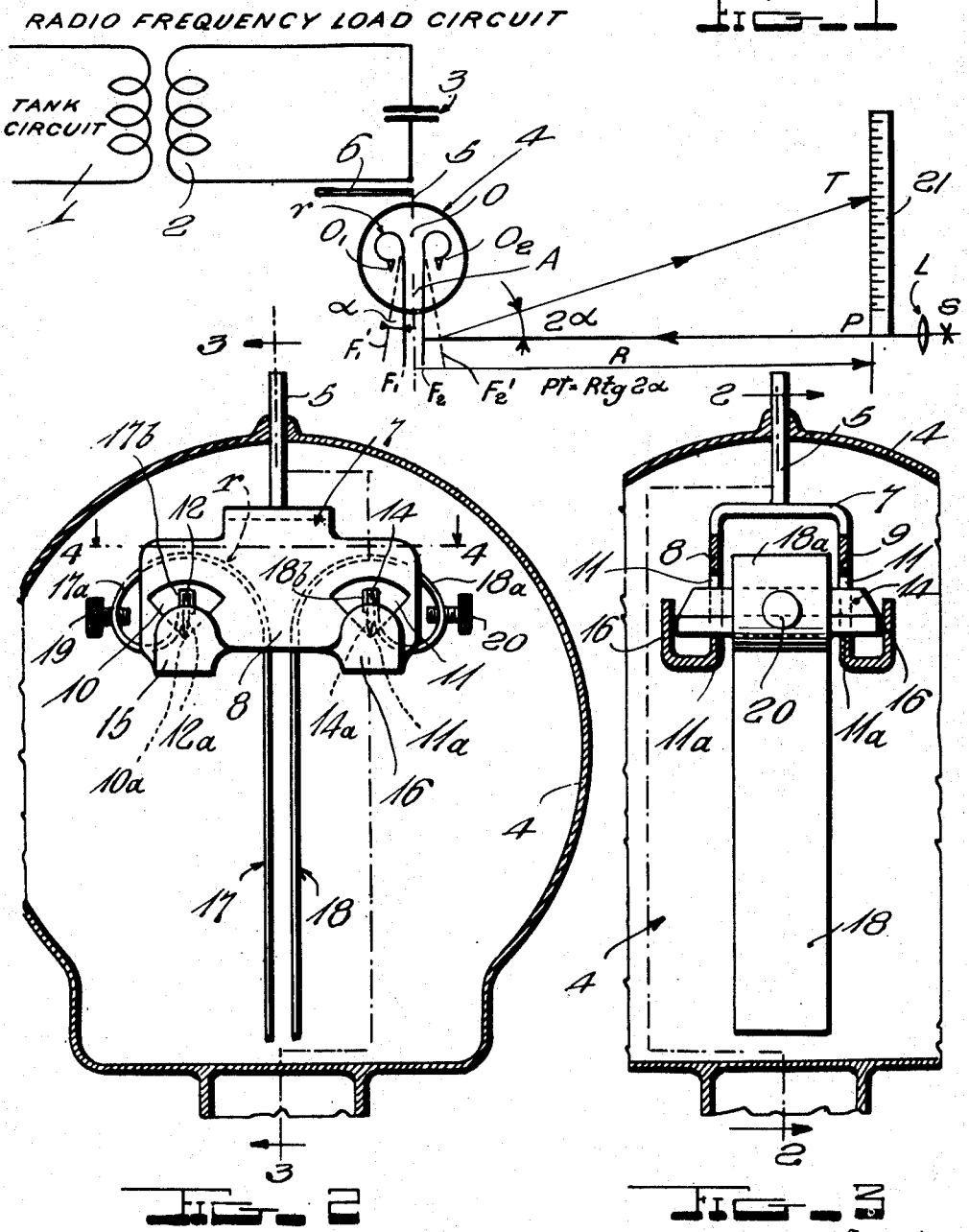

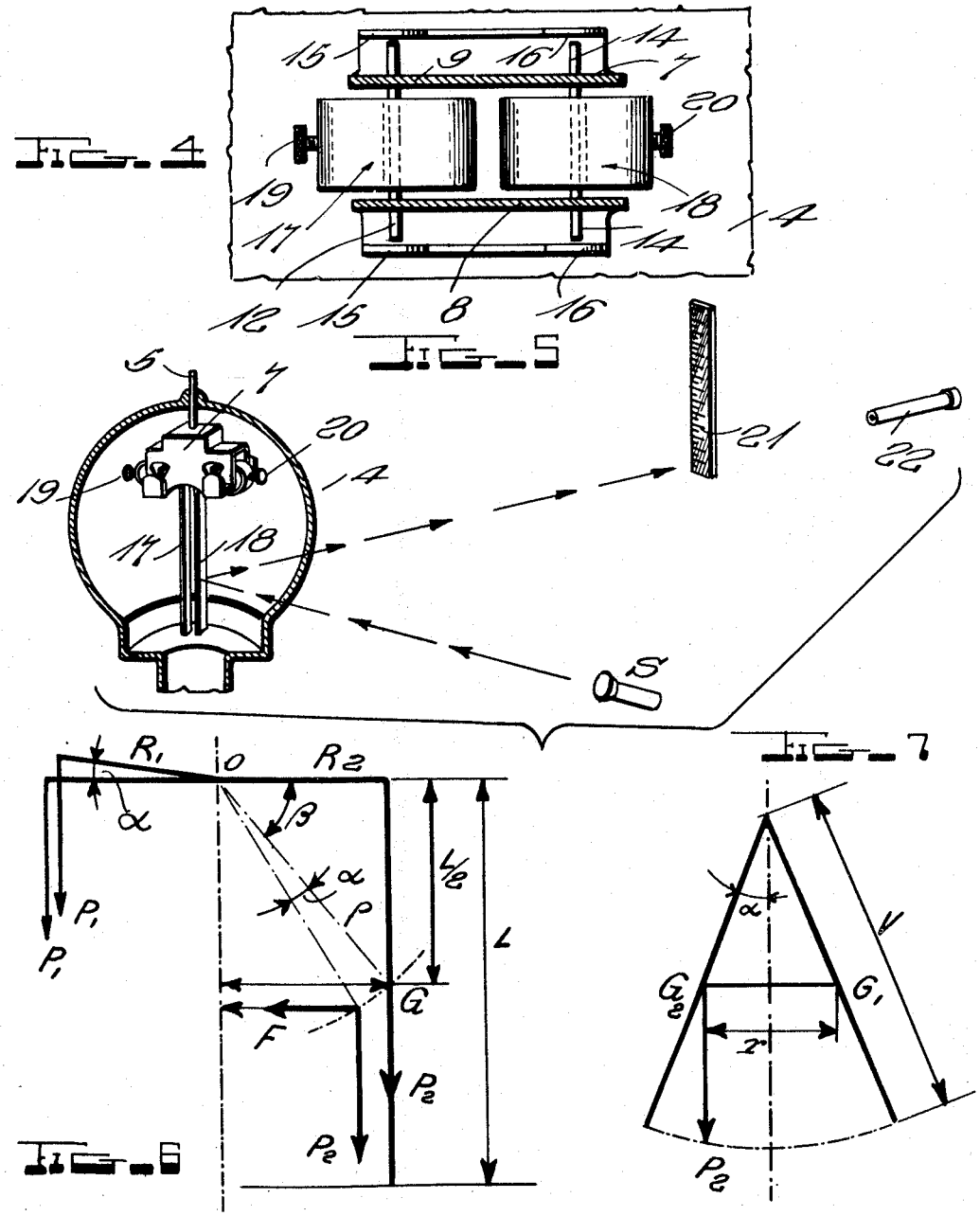

2,482,801

UNITED STATES PATENT OFFICE 2,482,801

ELECTROSTATIC MEASUREMENT OF HIGH-FREQUENCY VOLTAGE

Auguste Louis Marie Antoine Rouy, New York, N. Y., assignor to L. L. H. Company, Erie, Pa., a partnership Application July 25, 1945, Serial No. 607,052

12 Claims. (Cl. 171—95)

My invention relates broadly to electrical measuring systems and more particularly to an improved method and apparatus for the measurement of voltages in high frequency circuits.

One of the objects of my invention is to provide a construction of measuring apparatus for high frequency voltages which is highly sensitive and accurate in its reading and yet has no physical connection with the circuit in which the voltage is to be determined.

Another object of my invention is to provide a construction of electrostatic device for measuring high frequency voltages in which a pair of displaceable electrodes may be subjected to electric charges proportional to the voltage in a circuit in which voltage is to be determined whereby a reading may be made by use of an optical lever over a scale observable through a telescope.

Still another object of my invention is to provide a construction of high frequency high voltage measuring device in which the operator making the observation of the voltage value in a high frequency circuit may be isolated from the circuit under measurement for a substantial distance, thereby eliminating danger to the operator from contact with the high voltage in the high frequency circuit and avoiding the detrimental effects of body capacity on the circuit.

Other and further objects of my invention reside in the improved construction of electroscope for measuring high voltage high frequency currents as set forth more fully in the specification hereinafter following by reference to the accompanying drawings in which:

Figure 1 is a schematic view illustrating the application of the high frequency high voltage measuring device of my invention to the measurement of voltage in a radio frequency load circuit; Fig. 2 is an end view of the apparatus of my invention with the evacuated envelope thereof broken away and shown in section and illustrating in elevation approximately on line 2—2 of Fig. 3 the parallel relationship of the electrodes; Fig. 3 is a front elevational view of the displaceable electrodes and the means for pivotally mounting the electrodes of the apparatus illustrated in Fig. 2, the view being broken away and illustrated in sections substantially on line 3—3 of Fig. 2; Fig. 4 is a transverse sectional view taken on line 4—4 of Fig. 2; Fig. 5 is a perspective view illustrating the association of the apparatus of my invention with the optical measuring system for performing radio frequency voltage measurements from a remote position with respect to the radio frequency circuit on which measurements are being performed; Fig. 6 is a theoretical view illustrating the distribution of forces involved in the electrostatic displacement of the electrodes in the apparatus of my invention and Fig. 7 is a further theoretical view illustrating the forces incident upon the electrodes in the course of the deflection thereof during the operation of the apparatus of my invention.

It is well known that the measurement of voltages in circuits where a high frequency current flows is a very difficult matter. There are several reasons why the use of normal voltmeters is impracticable. In an oscillating circuit the apparent voltage due to the resonance depends in a large measure upon the point in the circuit at which the measurements have to be taken. Furthermore, the voltmeter of the conventional type cannot be used because this apparatus introduces a leakage of power destroying the balance of the circuits. Moreover, the flow of high frequency current depends upon the impedance of the voltmeter itself and this runs to a very high value in ultra high frequency operations.

The method and apparatus of my invention allows measurement of voltages at any point in an oscillating high frequency circuit by employing an improved construction of a gold leaf electroscope in association with an optical system.

Referring to the drawings in detail, Figure 1 shows the general arrangement of the method and apparatus of my invention by which measurement of high frequency voltages are observed, by readings that are made at a distance R from the point where the voltage is to be measured. Thus the operator does not introduce body capacity adjacent the oscillating circuit and is protected from danger of contact with high voltage high frequency currents in the tank circuit. The tank circuit shown at 1 is representative of any high voltage high frequency circuit containing inductance 2 and capacity 3. The measuring apparatus of my invention is represented as including an evacuated envelope 4 from which there extends the conductor 5 which may be capacitatively related as represented at 6 to any portion of the high voltage high frequency tank circuit 1 in which the voltage is to be determined. The conductor 5 extends into the evacuated envelope 4 and connects to the supporting member 7. The supporting member 7 is shaped in the form of an inverted U having depending side walls represented at 8 and 9. The opposite side walls 8 and 9 are provided with pairs of oppositely disposed symmetrically arranged V-shaped apertures that I have represented at 10 and 11. These V-shaped apertures terminate in knife-edge supports represented at 10a and 11a for transversely extending bar members 12 and 14. The bar members 12 and 14 are terminated in knife edges represented at 12a and 14a supported by the V-shaped knife edge supports 10a and 11a respectively. The lower portions of the side plates 8 and 9 are provided with pairs of lug members 15 and 16 which are bent upwardly and serve as limiting stops against the end-wise displacement of the bars 12 and 14.

The bars 12 and 14 serve as carriers for the foils or electrodes of the electroscope. The foils or electrodes are represented as having parallel extending portions 17 and 18 extending through looped portions 17a and 18a to a folded terminus represented at 17b and 18b. The folded terminus 17b and 18b of the respective electrodes embrace and fit over the side walls of the transverse bars 12 and 14. Thus each electrode 17 and 18 constitutes a pendantly supported member having a part of its mass distributed on one side of the fulcrum or pivoted points 10a and 11a and the other part of its mass distributed on the other side of the fulcrum or pivot 10a and 11a. Under normal conditions the electrodes 17 and 18 hang pendantly downward free to swing under electrostatic influence. In order to provide for the initial setting of the parallel electrodes 17 and 18 I introduce counterweight members 19 and 20 in each of the looped portions 17a and 18a of the electrodes. These counterweights are in the form of screw members which may be adjusted upwardly or downwardly to exactly adjust the mass of the foils or electrodes 17 and 18 to allow the foils or electrodes 17 and 18 to extend parallel to each other as represented in Fig. 2.

The surfaces of the foils or electrodes 17 and 18 are reflective in their characteristics so that a light source represented at S in Fig. 1 will direct a light beam toward the calibrated scale 21 in the form of a narrow line of light. The position to which the line of light moves along the calibrated scale 21 may be read through a suitable optical system such as a telescope focused upon the calibrated scale 21. If the calibrated scale 21 is carried by a transparent vertical strip then the position of the movable line of light may be read by arranging the telescope at a suitable distance beyond the calibrated scale 21 as indicated at 22 in Fig. 5. If the scale 21 is opaque with the calibrations carried by the opaque surface thereof then the telescope is located in a position opposite to that shown in Fig. 5 so that the telescope may be properly focused upon the scale.

Referring to Fig. 1 of the drawings I have indicated the foils 17 and 18 by the letters $O_1$, $F_1$ and $O_2$ and $F_2$ capable of rotating or angularly moving about the points $O_1$ and $O_2$. The foils 17 and 18 are repulsed or rotated through an angle in function of the voltage at the point O.

The light beam emitted by the light source S and focused by the lens L hits the surface of the foil $O_2F_2$ and is reflected toward the calibrated scale 21 at the point T. The rotation of the light beam is, from the well known properties of the rotating mirror equal to twice the rotation of the foil $O_2F_2$. Then the distance PT may be increased in any ratio by varying the distance R. The following proportion exists: $PT = R tg 2\alpha$.

In other words the sensitivity of the system is proportional to the distance R. This device can make the measurement of any static value of voltage or any alternating voltage. The voltage at point O may be either negative or positive without changing the value of the angle $\alpha$. When the voltage is alternating the angle will be proportional to only two efficient values, i. e. to the maximum voltage value divided by $\sqrt{2}$.

Fig. 1 indicates the shape of each of the foils $F_1$, $F_2$ which rotate around oscillating points $O_1$, $O_2$ located outside the vertical plane containing the foil. The foils are bent with a constant radius $r$ around their oscillating point in order to keep the distance between the two foils constant in the region A for any angle of rotation. The counterweights 19—20 insure the vertical balance of the foils, a balance which can be initially adjusted by moving the screws 19—20 inwardly or outwardly.

The conditions of the mechanical equilibrium of the system are shown by Figs. 6-7 in which: $P_1$ is the counterbalance force; $P_2$ the weight of the foil located at the center of gravity; $R_1$ the radius of rotation of $P_1$; $R_2$ the radius of rotation of the foil; $\rho$ the radius of rotation of the center of gravity of the foil; $F$ the force exerted by the voltage; $\alpha$ the angular displacement resulting from $F$. Then the equation of equilibrium is:

$$P_1 R_1 \cos \alpha = \rho_1 \cos (\beta+\alpha) \rho_2 + F\rho_1 \cos \left[\frac{\pi}{2} - (\beta+\alpha)\right]$$

which reduces after transformation to:

$$tg\alpha = \frac{\frac{P_1 R_1}{P_1} - P_2 \cos \beta - F \sin \beta}{F \cos \beta - P_2 \sin \beta}$$

in which by construction and adjustment we make:

$$\frac{P_1 R_1}{P_1} - P_2 \cos \beta = 0$$

so that $$tg\alpha = \frac{F \sin \beta}{P_2 \sin \beta - F \cos \beta}$$

It can be readily seen that when $P_2 \sin \beta - F \cos \beta = 0$ the sensitivity of the device will be infinite, which shows the conditions of an indifferent equilibrium.

Now we can complete the analysis of the system through the evaluation of the repulsion force F given through the voltage applied.

We know that the force of repulsion between the electric mass is given by $$F = \frac{MM^1}{2r^2}$$

in that case $$MM^1 = \frac{SV}{r^2}$$

We neglect a constant factor in this relationship which has no effect upon the functioning of the system. The surface of the foil is defined by its length L for unit of transversal dimension and we may write:

$$F = \frac{LV}{r^2} \text{ with } r = \frac{L}{2} \sin \alpha \times 2 = L \sin \alpha$$

The weight $P_2$ is for unit of transversal lengths.

$$P_2 = KL \text{ with } K = e\delta$$

in which $e$ = thickness
$\delta$ = density of material.

Finally we can evaluate the different functions as follows:

$$F = \frac{V}{L \sin \alpha} \quad P_1 = KL$$

Then the equation $$tg\alpha = \frac{F \sin \beta}{P_2 \sin \beta - F \cos \beta}$$

$$= \frac{V \sin \beta}{KL^2 \sin \alpha \sin \beta - V \cos \beta}$$

$$KL^2 \sin^2 \alpha = \frac{V \sin (\beta + \alpha)}{\sin \beta}$$

or $$\sin^2 \alpha = \frac{V}{KL^2} \frac{\sin(\beta+\alpha)}{\sin \beta} = \frac{V}{KL^2} \frac{(\sin \alpha \cos \beta + \sin \beta \cos \alpha)}{\sin \beta}$$

In order to estimate the sensitivity we have to consider a minute angle $\alpha$ of rotation which means $\alpha$ substantially equal to zero. In these conditions we have $\alpha \to 0$ $\sin \alpha = 0$ $\cos \alpha = 1$ and
$\sin \alpha \cos \beta = 0$ $\sin \beta \cos \alpha = \sin \beta$ and $\alpha$ being very small we can definitely express the sensitivity by $$\alpha = \frac{1}{L}\sqrt{\frac{V}{K}} = \frac{1}{L}\sqrt{\frac{V}{e\delta}}$$

which shows that the angle of rotation is proportional to the square root of the voltage, inverse to the length and inverse to the square root of the thickness of the foil and its density.

I have found the electroscope of my invention very practical in its construction and sensitive in operation. The electrodes 17 and 18 are confined by the attachments thereof to the bars 12 and 14 which are in turn limited in their displacement to the V-shaped apertures 10 and 11 in the side walls 8 and 9 of the supporting bar 7 and limited in end wise movements by the lug members 15 and 16. Thus shipment of the device can be made without subjecting the foils 17 and 18 to injury and yet provide a mounting arrangement of very great sensitivity. I realize that modifications may be made in details of the structural arrangement of the device of my invention and I desire that it be understood that no limitations upon my invention are intended other than may be imposed by the scope of the appended claims.

What I claim and desire to secure by Letters Patent of the United States is as follows:

1. In a system for measuring high frequency voltages a device adapted to be capacitatively related to a high frequency circuit in which the voltage is to be measured, said device comprising an evacuated envelope, a supporting means disposed in said envelope, means extending externally from said envelope and connected with said supporting means and adapted to establish capacitive relation to the high frequency circuit whose voltage is to be determined, a pair of angularly displaceable capacitatively related members mounted in spaced positions on said supporting means, said members being pivotally suspended and adapted to gravitationally hang in substantially parallel spaced planes, a light reflecting surface carried by one of said angularly displaceable capacitatively related members and means for restricting said members for movement in predetermined limits and restricted against endwise displacement.

2. In a system for measuring high frequency voltages, supporting means suspended in an evacuated envelope, a conductor connected with said supporting means and extending externally from said envelope for applying to said supporting means electric charges proportional to radio frequency voltages to be measured, a pair of capacitatively related members carried by said supporting means at spaced intervals thereon and pivotally mounted with respect to said supporting means for angular displacement with respect to each other through angular distances proportional to the electric charges impressed thereon and means for restricting said capacitatively related members against endwise displacement.

3. In an apparatus for measuring high frequency voltages, an evacuated envelope, a conductor extending into said envelope for delivering internally of said envelope electric charges external to said envelope, supporting means carried by said conductor, a pair of capacitatively related electrodes pivotally mounted on said supporting means at spaced intervals and adapted to normally hang in substantially parallel spaced planes and mutually separable in proportion to the electric charges imparted thereto, counterbalance means associated with each of said electrodes and abutment means for preventing endwise displacement of said pivotally mounted electrodes.

4. In an apparatus for measuring high frequency voltages an evacuated envelope, a conductor extending into said envelope for delivering internally of said envelope electric charges external to said envelope, supporting means carried by said conductor, a pair of capacitatively related electrodes pivotally mounted on said supporting means and operative to normally hang in substantially parallel spaced planes and mutually separable in proportion to the electric charges imparted thereto, a screw threaded adjustable counterbalance associated with each of said electrodes and selectively settable with respect thereto and means for obstructing endwise displacement of said capacitatively related pivotally mounted electrodes.

5. In a device for measuring high frequency voltages, an evacuated envelope, a support disposed in said envelope, a conductor extending from said support to a position external to said envelope for impressing electric charges thereon from an external circuit whose high frequency voltage is to be determined, symmetrically arranged slots in said support, a transverse knife-edge member pivotally mounted in said slots, an electrode attached to each of said transverse knife-edge members and extending in planes initially substantially parallel one to the other and angularly displaceable with respect to each other according to the amplitude of voltage impressed thereon for effecting mutual angular displacement of said electrodes and means carried by said support and establishing abutting relation with opposite ends of said transverse knife-edge members for obstructing endwise movement of said transverse knife-edge members.

6. In a device for measuring high frequency voltages, an evacuated envelope, a support disposed in said envelope, a conductor extending from said support to a position external to said envelope for impressing electric charges thereon from an external circuit whose high frequency voltage is to be determined, symmetrically arranged slots in said support, a transverse knife-edge member pivotally mounted in said slots, an electrode attached to each of said transverse knife-edge members and extending in planes initially substantially parallel one to the other and angularly displaceable with respect to each other according to the amplitude of voltage impressed thereon for effecting mutual angular displacement of said electrodes, an adjustable counterbalance weight associated with each of said electrodes for initially adjusting the mass of said electrodes and means integral with said support for obstructing endwise displacement of said transverse knife-edge members.

7. In a device for measuring high frequency voltages, an evacuated envelope, a support disposed in said envelope, a conductor extending from said support to a position external to said envelope for impressing electric charges thereon from an external circuit whose high frequency voltage is to be determined, symmetrically arranged substantially V-shaped slots in said support, a transverse knife-edge member pivotally mounted in said substantially V-shaped slots, an electrode attached to each of said transverse knife-edge members and extending in planes initially substantially parallel one to the other and angularly displaceable with respect to each other according to the amplitude of voltage impressed thereon for effecting mutual angular displacement of said electrodes and means coextensive with the sides of said support for preventing endwise displacement of said transverse knife-edge members.

8. In a device for measuring high frequency voltages, an evacuated envelope, a support disposed in said envelope, a conductor extending from said support to a position external to said envelope for impressing electric charges thereon from an external circuit whose high frequency voltage is to be determined, symmetrically arranged slots in said support, a transverse knife-edge member pivotally mounted in said slots, an electrode attached to each of said transverse knife-edge members and extending in planes initially substantially parallel one to the other and angularly displaceable with respect to each other according to the amplitude of voltage impressed thereon for effecting mutual angular displacement of said electrodes, and means for restricting the endwise movement of said transverse knife-edge members.

9. In a device for measuring high frequency voltages, an evacuated envelope, a support disposed in said envelope, a conductor extending from said support to a position external to said envelope for impressing electric charges thereon from an external circuit whose high frequency voltage is to be determined, pairs of symmetrically arranged slots in said support, a transverse knife-edge member pivotally mounted in each of said pair of slots, an electrode attached to each of said transverse knife-edge members and extending in planes initially substantially parallel one to the other and angularly displaceable with respect to each other according to the amplitude of voltage impressed thereon for effecting mutual angular displacement of said electrodes, lugs extending from said support and extending upwardly across a path through the slots in said support and forming end abutments for restricting the endwise displacement of said transverse knife-edge members.

10. In an apparatus for measuring high frequency voltages, an evacuated envelope, a conductor extending into said envelope for delivering internally of said envelope electric charges external to said envelope, supporting means carried by said conductor, a pair of spacially positioned capacitatively related electrodes each comprising substantially parallel spaced plane surfaces each extending through curved surfaces substantially convex to each other to spacially positioned transverse bars, means for pivotally supporting said transverse bars for pendantly suspending said electrodes in substantially parallel positions displaceable in proportion to the electrostatic forces existent therebetween and means carried by said supporting means for restricting endwise displacement of said transverse bars.

11. In an apparatus for measuring high frequency voltages, an evacuated envelope, a conductor extending into said envelope for delivering internally of said envelope electric charges external to said envelope, supporting means carried by said conductor, a pair of capacitatively related electrodes each extending through curved surfaces substantially convex to each other to spacially positioned transverse bars, means for pivotally supporting said transverse bars for pendantly suspending said electrodes in positions displaceable in proportion to the electrostatic forces existent therebetween, means for adjustably counterbalancing each of said electrodes and means carried by said supporting means for obstructing endwise displacement of said transverse bars.

12. In an apparatus for measuring high frequency voltages, an evacuated envelope, a conductor extending into said envelope for delivering internally of said envelope electric charges external to said envelope, supporting means carried by said conductor, a pair of capacitatively related electrodes each extending through curved surfaces substantially convex to each other to spacially positioned transverse bars, means for pivotally supporting said transverse bars for pendantly suspending said electrodes in positions displaceable in proportion to the electrostatic forces existent therebetween, an adjustable counterbalance device adjustably mounted adjacent the curved surface of each of said electrodes for adjustably balancing each of said electrodes with respect to the pivotal support thereof and means integrally connected with said supporting means for obstructing endwise displacement of said transverse bars.

AUGUSTE LOUIS MARIE ANTOINE ROUY.

REFERENCES CITED

The following references are of record in the file of this patent:

UNITED STATES PATENTS

| Number | Name | Date |
| --- | --- | --- |
| 627,155 | Thomson | June 20, 1899 |
| 1,059,095 | Whitehead | Apr. 15, 1913 |
| 1,764,294 | Fielder | June 17, 1930 |
| 1,815,606 | Barton | July 21, 1931 |

FOREIGN PATENTS

| Number | Country | Date |
| --- | --- | --- |
| 11,194 | Great Britain | June 15, 1893 |